(12) United States Patent
Jehlicka et al.

(10) Patent No.: US 11,255,461 B2
(45) Date of Patent: Feb. 22, 2022

(54) EMERGENCY STOP VALVE

(71) Applicant: GCE Holding AB, Malmö (SE)

(72) Inventors: Petr Jehlicka, Zdírec nad Doubravou (CZ); Karel Zmek, Malmö (SE); Gareth Pemberton, Worcester (GB)

(73) Assignee: GCE HOLDING AB, Malmö (SE)

( * ) Notice: Subject to any disclaimer, the term of this patent is extended or adjusted under 35 U.S.C. 154(b) by 281 days.

(21) Appl. No.: 16/475,458

(22) PCT Filed: Jan. 11, 2017

(86) PCT No.: PCT/EP2017/050478
§ 371 (c)(1),
(2) Date: Jul. 2, 2019

(87) PCT Pub. No.: WO2018/130275
PCT Pub. Date: Jul. 19, 2018

(65) Prior Publication Data
US 2020/0032913 A1    Jan. 30, 2020

(51) Int. Cl.
*F16K 35/02* (2006.01)
*F16K 1/30* (2006.01)
(Continued)

(52) U.S. Cl.
CPC ............ *F16K 35/027* (2013.01); *F16K 1/04* (2013.01); *F16K 1/303* (2013.01); *F16K 1/306* (2013.01);
(Continued)

(58) Field of Classification Search
CPC . F16K 31/50; F16K 1/04; F16K 1/306; F16K 35/02; F16K 35/025; F16K 35/022;
(Continued)

(56) References Cited

U.S. PATENT DOCUMENTS 2,960,304 A * 11/1960 Goss ..................... F23D 14/465
                                                                 251/276
2,997,052 A *  8/1961 Mangini ................. F16K 31/56
                                                                 137/77

(Continued)

FOREIGN PATENT DOCUMENTS

DE        2124485 A1    12/1971
DE       10354269 A1     6/2005

OTHER PUBLICATIONS

International Search Report and Written Opinion for International Application No. PCT/EP2017/050478 dated Sep. 7, 2017, 4 pages.
(Continued)

*Primary Examiner* — Atif H Chaudry
(74) *Attorney, Agent, or Firm* — Edell, Shapiro & Finnan, LLC

(57) ABSTRACT

The invention relates to shut-off valve for controlling flow of a pressurised gas. The shut-off valve comprising a body defining a passage extending between a gas inlet channel and a gas outlet channel, a sealing element, and an emergency stop mechanism. The sealing element arranged to, in a first position, close the passage, and in a second position, open the passage to allow gas to flow between the gas inlet channel and the gas outlet channel through the passage. The invention also relates to a method for controlling flow of a pressurised gas with a shut-off valve and a method for activating an emergency stop of a shut-off valve.

17 Claims, 6 Drawing Sheets

(51) Int. Cl.
  *F16K 17/00* (2006.01)
  *F16K 1/04* (2006.01)
  *F17C 13/04* (2006.01)
  *F15B 15/26* (2006.01)
  *F16K 31/50* (2006.01)
  *F16K 31/56* (2006.01)
  *F16K 35/04* (2006.01)

(52) U.S. Cl.
  CPC .............. *F16K 17/00* (2013.01); *F16K 35/02* (2013.01); *F16K 35/022* (2013.01); *F16K 35/025* (2013.01); *F17C 13/04* (2013.01); *F15B 15/261* (2013.01); *F16K 31/50* (2013.01); *F16K 31/56* (2013.01); *F16K 35/04* (2013.01); *F17C 2205/0329* (2013.01); *F17C 2205/0385* (2013.01); *F17C 2205/0394* (2013.01)

(58) Field of Classification Search
  CPC .................... F16K 35/027; F17C 13/04; F17C 2205/0329; F17C 2205/0394; F17C 2205/0385
  See application file for complete search history.

(56) References Cited

U.S. PATENT DOCUMENTS 3,778,027 A    12/1973  Collins et al.
3,785,615 A *  1/1974   Haven .................... F01D 21/18
                                                     251/74

OTHER PUBLICATIONS

Notification of Transmittal of the International Preliminary Report on Patentability including International Preliminary Report on Patentability for International Application No. PCT/EP2017/050478, completed Dec. 19, 2018, 25 pages.

* cited by examiner

EMERGENCY STOP VALVE

TECHNICAL FIELD

The invention relates to a shut-off valve and a method for controlling flow of a pressurised gas.

BACKGROUND ART

Shut-off valves are commonly used for compressed gases. One example of such a valve is disclosed in DE 103 54 299 A1. However, there are several problems associated with known shut-off valves. For example, immediately after opening of the shut-off valve, the gas has a high speed. This may lead to particle impact ignition when the gas rapidly reaches non-pressurised areas as the gas may captive particles that, if they impact on some surface, may cause ignition as their kinetic energy is converted to heat.

Another problem which may arise is that adiabatic compression caused by the opening of the shut-off valve and gas entering non-pressurised areas may lead to increase in temperature of the gas for a moment. This increase in temperature may in some cases lead to the ignition of components. this is the case for components having a low auto-ignition temperature.

A further problem with conventional valves is that the closing of the same requires several turns of a hand wheel which is time consuming. Also, it is difficult for the used to determine if the valve is open or closed.

U.S. Pat. No. 3,778,027 discloses a quick closing valve actuator. This valve is opened against the force of a spring by motion-transmitting means operated by a hand wheel or other conventional valve-operating mechanism. The invention provides quick release mechanism between the valve and hand wheel to release the valve from its connection with the hand wheel so that the spring can cause instantaneous closing of the valve. In the preferred construction, balls extending into the path of a spring retainer hold the spring under the load imparted to it by the hand wheel or other hand-operating mechanism. A release pin moves a groove under the balls so that they can move inward and out of the path of the spring retainer, and this causes the spring to advance the retainer into position to close the valve and hold it closed. Movement of the hand wheel and its connections into valve closed position resets the mechanism for reopening the valve.

DE 21 24 485 discloses a tap torch for welding or cutting. The tap torch includes a valve body, a valve seat, a valve head situated at the tip of a valve stem, an actuator, and a spring which provides the abrupt closure of the tap by thrust on the valve stem and a lock preventing the action of the spring when the desired opening and closing of the valve are performed by screwing or unscrewing of the actuator.

The above described problems particularly occur for shut-off valves used with highly oxidized gases, that is, gases having a higher share of oxygen than air, because higher oxygen content increase the probability of ignition.

There is thus a need for an improved shut-off valve for compressed gases.

SUMMARY OF THE INVENTION

It is an objective of the present invention to provide an improvement of the above technique and prior art. More particularly, it is an objective of this invention to provide an improved shut-off valve which mitigate, alleviate or eliminate one or more of the above-identified problems.

According to a first aspect, these and other objects, and/or advantages that will be apparent from the following description of embodiments, are achieved, in full or at least in part, by a shut-off valve for controlling flow of a pressurised gas. The shut-off valve comprises a body defining a passage extending between a gas inlet channel and a gas outlet channel, and a sealing element arranged to, in a first position, close the passage, and in a second position, open the passage to allow gas to flow between the gas inlet channel and the gas outlet channel through the passage. The shut-off valve is characterised in that it further comprises an emergency stop mechanism which upon actuation is adapted to immediately move the sealing member into the first position, thereby closing the passage to prevent gas from flowing between the gas inlet channel and the gas outlet channel.

This is advantageous in that the shut-off valve enables closing a valve with push mechanism. In the event of an emergency the valve can be closed but pushing a button. This is much quicker to operate than traditional methods which involved rotating the valve mechanism, often greater than 360 degrees.

The emergency stop mechanism comprises a sliding spindle connected to the sealing element, a biasing element for biasing the sealing element in a direction towards the sliding spindle, a rotation spindle in rotational engagement with the sliding spindle, and an engagement means adapted to prevent axial movement of the sliding spindle in relation to the rotation spindle in a normal state and to allow axial movement of the sliding spindle in relation to the rotation spindle in an emergency state.

The sliding spindle may comprise a through hole for holding the engagement means, and the rotation spindle may comprise a recess adapted for receiving a portion of the engagement means in the normal state of the shut-off valve. Here, the shut-off valve further comprises a pin member movably arranged in the sliding spindle and comprising a recess adapted for receiving a portion of the engagement means in the emergency state of the shut-off valve. The pin member, when the sealing element is in the second position, upon movement in an axial direction, aligns its recess with the through hole of the sliding spindle and the recess of the rotations spindle, so that the engagement means moves out of the recess of the rotations spindle and into the recess of the pin member, thereby activating the emergency state of the shut-off valve by allowing axial movement of the sliding spindle and thus the sealing element into the first position.

The shut-off valve may further comprise a pin element at least partly arranged in the passage which connects the sliding spindle with the sealing element, wherein the biasing element is arranged for biasing a first end of the sealing element such that a second end of the sealing element is in contact with the pin element.

The pin element may comprise guiding means for guiding a gas flow between the gas inlet channel and the gas outlet channel when the sealing element is in the second position, the guiding means extending in the longitudinal direction of the pin element and being arranged to allow gas to leave the passage in a radial direction of the pin element.

Opening a valve often results in a sudden rush of fluid, while closing a valve often takes longer to stop the flow of fluid. The present shut-off valve enables closing a valve quickly but with a controlled slow opening. As the shut-off valve is opened by moving the sealing member from the first to the second position, gas may flow from the gas inlet to the gas outlet via the passage. Particularly, the gas flow is guided by the guiding means of the pin element to leave the passage in a radial direction of the pin element. The design of the pin element will ensure that a quick start opening of the valve is avoided. The guiding means of the pin element which is present in the passage will only allow lower gas flow through the limited area between external diameter of the pin element and the inner wall of the passage.

There is a further advantage in that an improved life for the valve components can be achieved as it is subjected to less intense pressure variations upon opening and closing of the valve.

The pin element may further comprise restriction means at the axial end which is in contact with the sealing element. The restriction means extends along the circumference of the pin element and bear against the inner surface of the part of the passage which consists of an internal space in the valve body in which the pin element is at least partly located. When the movement of the pin element and thus the sealing element in an axial direction is big enough, the restriction means goes outside of the internal space and thus full opening of the valve is achieved. The restriction means is preferably tapering in an axial direction from the axial end which is in contact with the sealing element in order to further enhance the slow opening of the valve.

The design of the restriction means provides for a slow opening but a quick closing of the shut-off valve. This is a big advantage as it reduces the adiabatic compression when opening the shut-off valve and hence reduces the risk of ignition.

In one preferred embodiment, the body comprises an inner threading, and the rotation spindle is connected to the pin element via the sliding spindle and has an outer threading in engagement with the inner threading of the body. Here, rotation of the sliding spindle and thus the rotation spindle in a first direction moves the sealing element from the first position to the second position via the pin element, and rotation of the sliding spindle in a second direction allows the sealing element to move from the second position to the first position by means of the biasing element.

The shut-off valve may further comprise a hand wheel which is connected to the sliding spindle. The hand wheel may further be connected to the pin member.

The inner and the outer threading may be a high-pitched threading, respectively. This enables opening and closing of the valve with minimum rotation (120 degrees). This is a particular user improvement since a reduced rotation leads to the system being in operation quicker than standard rotations (often greater than 360 degrees).

The shut-off valve may further comprise a lower spindle housing the sealing element and in connection with the biasing element.

The guiding means may comprise a longitudinally extending recess formed in an outer surface of the pin element, wherein the outer surface extends between a first and a second axial end.

In one preferred embodiment, the gas inlet channel and the passage may be arranged essentially perpendicular to each other, the gas outlet channel and the passage may be arranged essentially perpendicular to each other, and the gas inlet channel and the gas outlet channel may be arranged in parallel with a distance between them, the distance being bridged by the passage.

The shut-off valve may further comprise a status indicator adapted to indicate a state of the shut-off valve, the state being chosen from the group consisting of opened, closed, partially opened and/or closed by emergency stop.

According to a second aspect, these and other objects are achieved, in full or at least in part, by a method for controlling flow of a pressurised gas by means of a shut-off valve according to the features described above. The method is characterised by the steps of moving the sealing element from the first position to the second position and thus allowing gas to flow between the gas inlet channel and the gas outlet channel through the passage, and moving the sealing element from the second position to the first position and thus prevent gas from flowing between the gas inlet channel and the gas outlet channel through the passage.

According to a third aspect, these and other objects are achieved, in full or at least in part, by a method for activating an emergency stop of a shut-off valve according to the features described above. The method is characterised by the step of activating the emergency stop mechanism, whereby the sealing member immediately moves into the first position, thereby closing the passage to prevent gas from flowing between the gas inlet channel and the gas outlet channel.

Effects and features of the second aspect and third aspect of the present invention is largely analogous to those described above in connection with the first aspect the inventive concept. Embodiments mentioned in relation to the first aspect of the present invention are largely compatible with the further aspects of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figure 1:
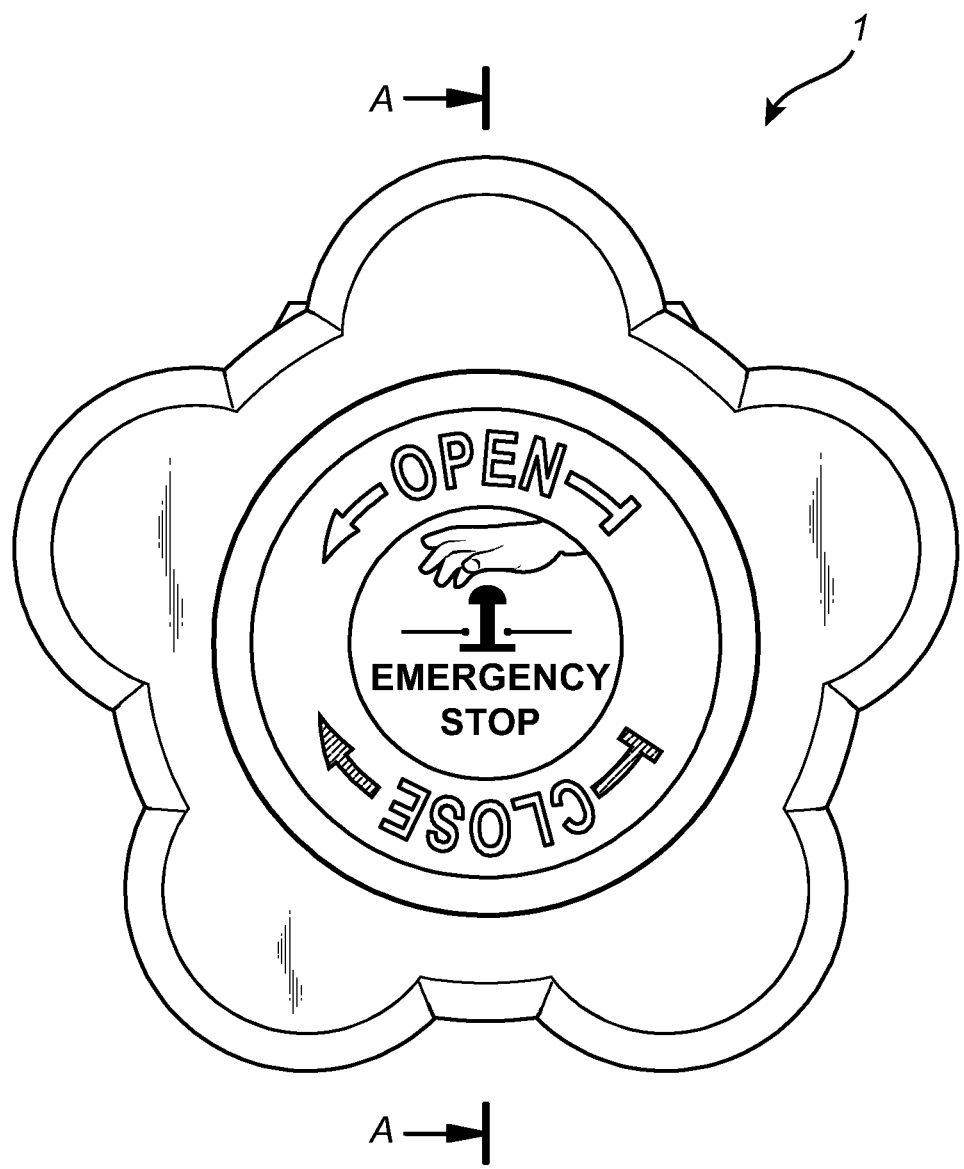
FIG. 1 is a top view of a hand wheel for a shut-off valve according to one exemplary embodiment of a first aspect of the invention.

FIG. 1 illustrates a hand wheel 1 for a shut-off valve 2 for controlling flow of a pressurised gas according to one exemplary embodiment of the invention. By rotating the hand wheel 1, the shut-off valve 2 is placed in an opened or a closed state. The shut-off valve 2 also has an emergency state which is triggered by pushing the hand wheel 1 downwardly in an axial direction thereof and which immediately places the shut-off valve 2 in the closed state.

Figure 2:
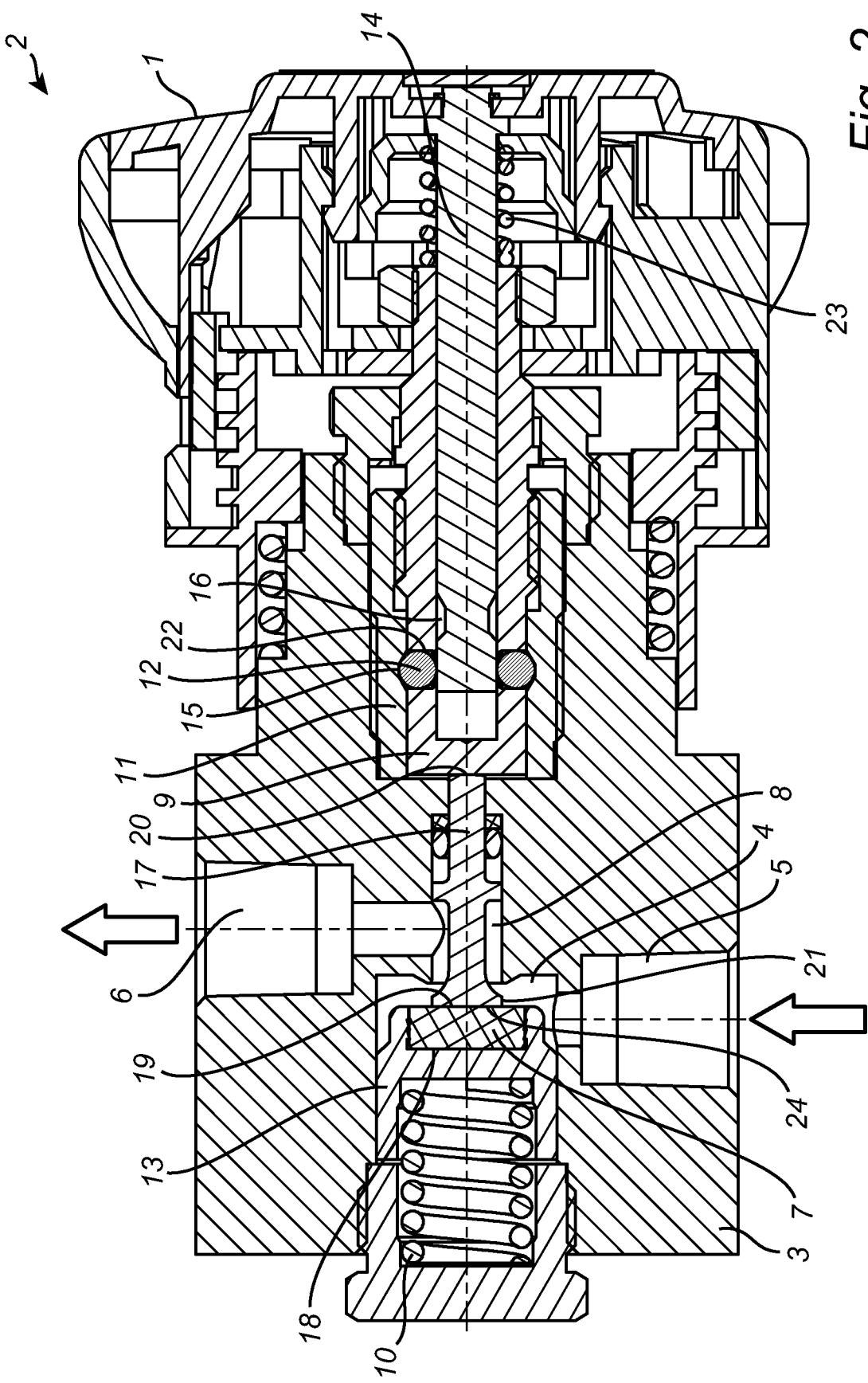
FIG. 2 is an overall cross sectional view of the shut-off valve.

FIG. 2 gives a complete overview of the shut-off valve 2. The shut-off valve 2 comprises a body 3 defining a passage 4 which extends between a gas inlet channel 5 and a gas outlet channel 6, and a sealing element 7 arranged to, in a first position, close the passage 4, and in a second position, open the passage 4 to allow gas to flow between the gas inlet channel 5 and the gas outlet channel 6 through the passage 4. The shut-off valve 2 further comprises an emergency stop mechanism which upon actuation is adapted to immediately move the sealing element 7 into the first position, thereby closing the passage 4 to prevent gas from flowing between the gas inlet channel 5 and the gas outlet channel 6.

The emergency stop mechanism comprises a sliding spindle 9 which is connected to the sealing element 7, a biasing element 10 for biasing the sealing element 7 in a direction towards the sliding spindle 9, a rotation spindle 11 in rotational engagement with the sliding spindle 9, and an engagement means 12 adapted to prevent axial movement of the sliding spindle 9 in relation to the rotation spindle 11 in a normal state and to allow axial movement of the sliding spindle 9 in relation to the rotation spindle 11 in the emergency state. Further, the shut-off valve 2 has a lower spindle 13 housing the sealing element 7. The lower spindle 13 is in direct connection with the biasing element 10.

The sliding spindle 9 is constituted by a hollow cylinder and is adapted to receive a pin member 14, which is movably arranged in the sliding spindle 9. The sliding spindle 9 comprises a through hole 22 for holding the engagement means 12. The rotation spindle 11 comprises a recess 15 adapted for receiving a portion of the engagement means 12 in the normal state of the shut-off valve 2. The pin member 14 comprising a recess 16 adapted for receiving a portion of the engagement means 12 in the emergency state of the shut-off valve 2.

In the specific embodiment disclosed in FIG. 2, the engagement means 12 comprises two ball members, Therefore, the sliding spindle 9 comprises one through hole 22 on each side thereof for holding the ball members 12. Further, the rotation spindle 11 comprises one recess 15 on each side thereof adapted for receiving a portion of the ball members 12 when the shut-off valve 2 is in the normal state, and the pin member 14 comprises one recess 16 one each side thereof adapted for receiving a portion of the ball members 12 when the shut-off valve 2 is in the emergency state.

The shut-off valve 2 further comprises a pin element 17 arranged in the passage 4 which connects the sliding spindle 9 with the sealing element 7. Thus, the biasing element 10 is arranged for biasing a first end 18 of the sealing element 7 such that a second end 19 of the sealing element 7 is in contact with the pin element 17. The rotation spindle 11 is connected to the pin element 17 via the sliding spindle 9.

The pin element 17 comprises guiding means 8 for guiding a gas flow between the gas inlet channel 4 and the gas outlet channel 5 when the sealing element 7 is in the second position. The guiding means 8 extends in the longitudinal direction of the pin element 17 and is arranged to allow gas to leave the passage 4 in a radial direction of the pin element 17.

The guiding means 8 comprises a longitudinally extending recess formed in an outer surface of the pin element 17. The outer surface of the pin element 17 extends between a first 24 and a second 20 axial end of the pin element 17.

The pin element 17 comprises restriction means 21 at the first axial end 24 which is in contact with the sealing element 7. The restriction means 21 surrounds the pin element 17 in a circumferential direction and is tapering in an axial direction from the first axial end 24 towards the second axial end 20 in a concave manner.

The valve body 3 comprises an inner threading and the rotation spindle 11 has an outer threading in engagement with the inner threading of the valve body 2. Therefore, rotation of the sliding spindle 9 and thus the rotation spindle 11 in a first direction moves the sealing element 7 from the first position to the second position via the pin element 17, and rotation of the sliding spindle 9 in a second direction allows the sealing element 7 to move from the second position to the first position by means of the biasing element 10.

Both the gas inlet channel 5 and the passage 4, and gas outlet channel 6 and the passage 4 are arranged essentially perpendicular to each other. The gas inlet channel 5 and the gas outlet channel 6 are further arranged in parallel with a distance between them, where the distance is bridged by the passage 4.

Figure 3A:
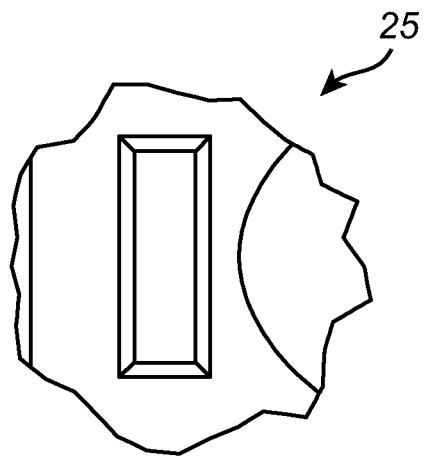
FIG. 3a is a cross sectional view of a portion of the shut-off valve, when in an open state.
Figure 3A:
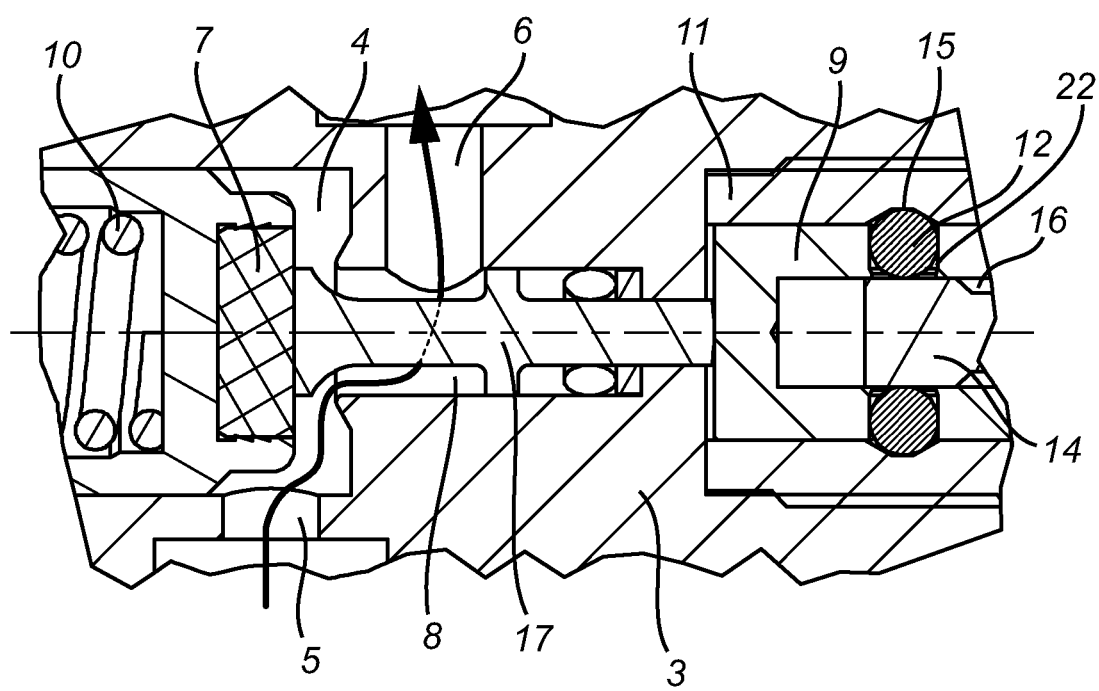
Figure 3B:
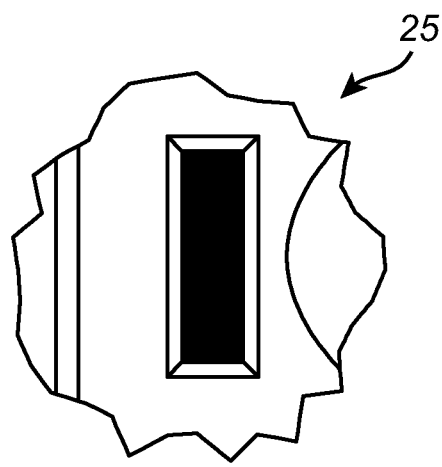
FIG. 3b is a cross sectional view of a portion of the shut-off valve, when in a closed state.
Figure 3B:
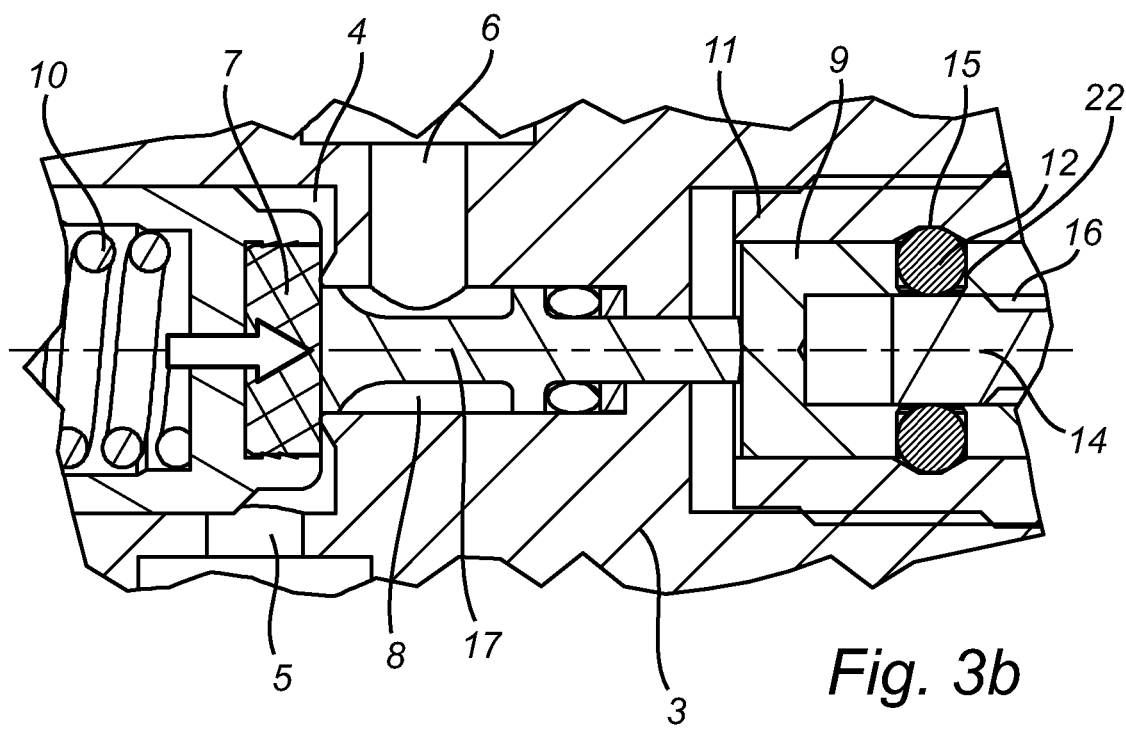

The following passages describes normal operation of the shut-off valve 2 and relates to FIG. 3*a* and FIG. 3*b*.

Opening and closing of the shut-off valve 2 is realised through the hand wheel 1, which is joined by a nut and square plate with the sliding spindle 9. The sliding spindle 9 matches with the rotation spindle 11 through grooving and will ensure a rotational joint between the two components while only allowing axial movement upon activation of the emergency stop mechanism.

When the hand wheel 1 is rotated anticlockwise, the rotation spindle 11 together with the sliding spindle 9 is rotated as well and consequently moves together with the pin element 17 in the axial direction. Subsequently, the sealing element 7 is moved into the second position via the pin element 17 such that the passage 4 between the inlet channel 5 and the outlet channel 6 is open to allow medium to pass through (FIG. 3*a*).

When the hand wheel 18 is rotated clockwise, the rotation spindle 11 together with the sliding spindle 9 is rotated as well and consequently moves together with the pin element 17 in the opposite axial direction so that the sealing element 7 is allowed to move back into the first position by means of the biasing force from the biasing element 10 acting upon the lower spindle 13, which houses the sealing element 7. Here, in the first position, the sealing element 7 is in engagement with the valve body 2 and thus the passage 4 between the inlet channel 5 and the outlet channel 6 is closed to stop medium from passing through (FIG. 3*b*).

Figure 4A:
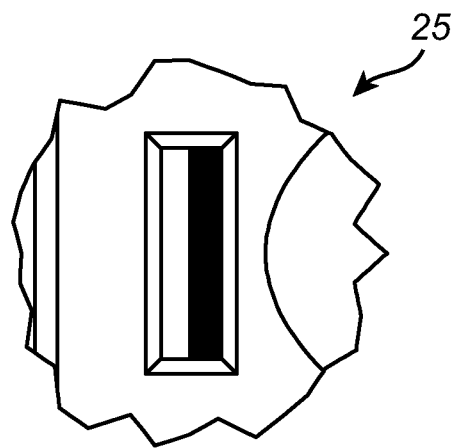
FIG. 4a is a cross sectional view of a portion of the shut-off valve, when in the closed state.
Figure 4A:
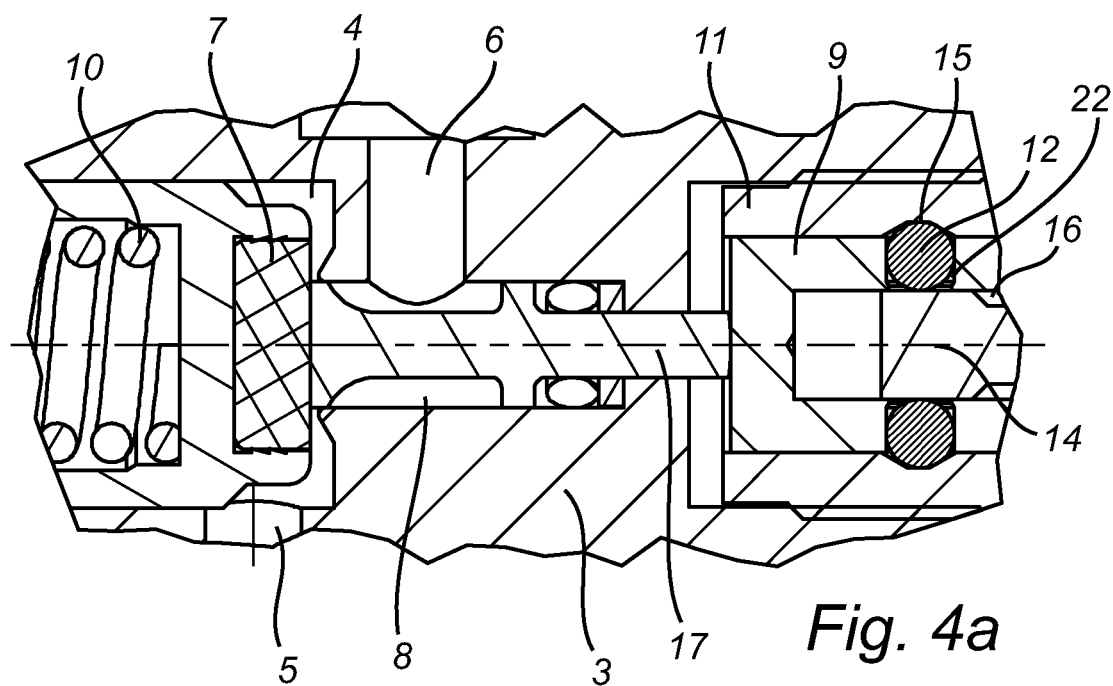
Figure 4B:
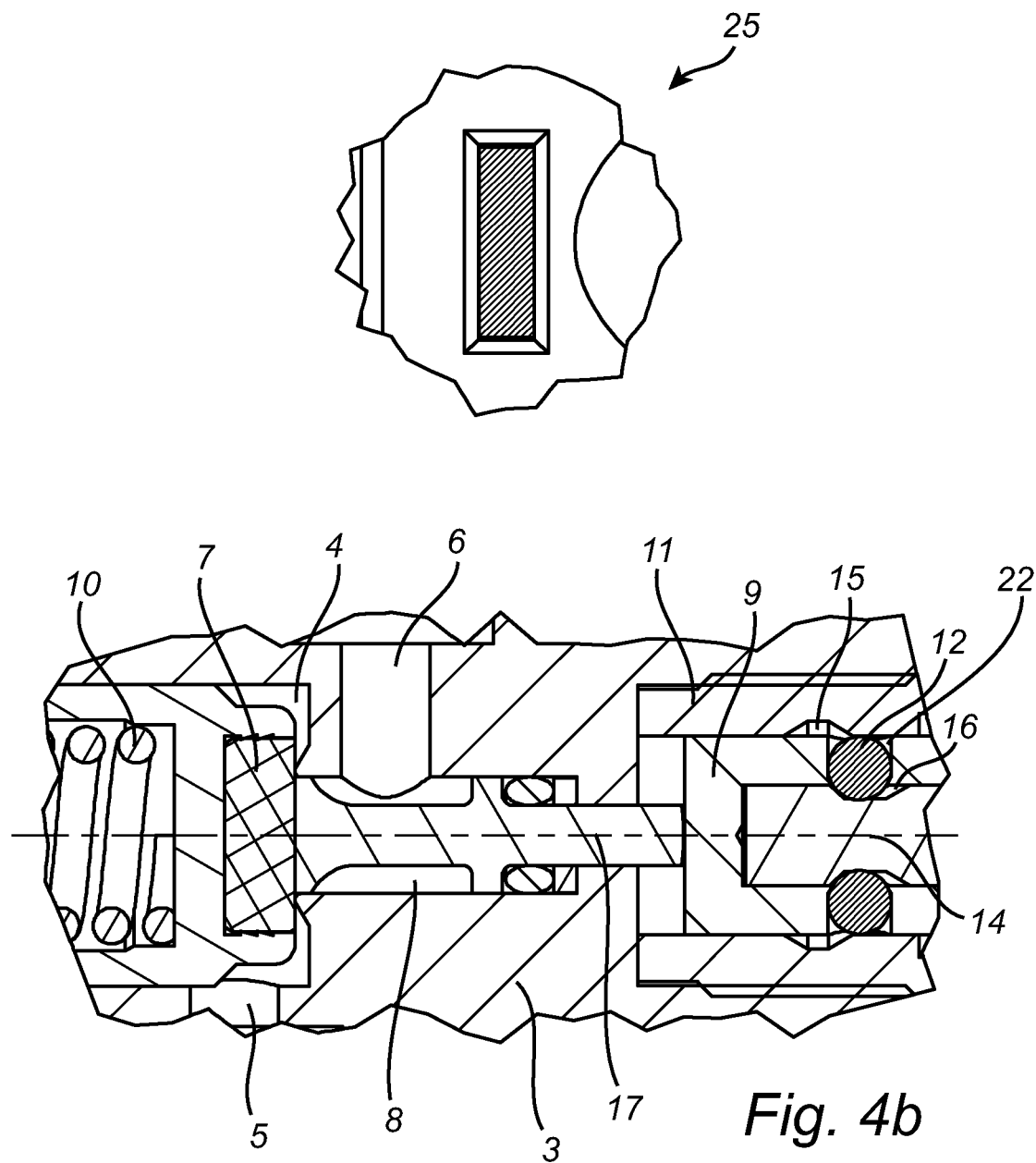
FIG. 4b is a cross sectional view of a portion of the shut-off valve, when in an emergency state.

The following passages describes operation of the shut-off valve 2 during an emergency and relates to FIG. 4*a* and FIG. 4*b*.

When valve is in fully or partially open position (FIG. 3*a* or FIG. 4*a*), it is possible to activate emergency stop state by pushing the hand wheel 1 in the axial direction and thus immediately close the shut-off valve 2. When the hand wheel 1 is pushed, it moves the pin member 14 in axial direction accordingly. When the pin member 14 movement is so big that the recesses 16 of the pin member 14 are aligned with the through holes 22, the ball members 12 will shrink in the radial direction out of engagement with the recesses 15 of the rotation spindle 11 and into engagement with the recesses 16 of the pin member 14. As a consequence, the sliding spindle 9 will be free from engagement with the rotation spindle 11 in the axial direction. Thus, the biasing element 10 will move the lower spindle 13 and thus the sealing element 7 into the first position, thereby activating the emergency state of the shut-off valve 2. Simultaneously, the pin element 17 and the sliding spindle 9 will be moved into their idle positions since both components are connected to the sealing element 7.

Once the emergency state is activated (FIG. 4b), the shut-off valve 2 stays in the closed position until the emergency stop mechanism is reset. For reset of the emergency stop mechanism it is necessary rotate the hand wheel 1 in clockwise direction. Consequently, the rotation spindle will be rotated and moved as well. When the movement of the rotation spindle 11 is so big that the recesses 15 are aligned with the ball members 12, the ball members will expand in the radial direction. Thereafter, the pin member 14 and the hand wheel 1 is moved by spring 23 into the idle position.

The shut-off valve 2 is also fitted by a status indicator 25 which comprises a sliding indicator 26, an indicator guide 27 and an indicator spring 28. In addition to that, the hand wheel 1 is equipped with a window 29 which is located around outer cylindrical surface of the shut-off valve 2 and through which the status is indicated for the user.

The sliding indicator 26 is rotating together with the hand wheel 1. The indicator guide 27 is not rotatable because of ribs matching grooves in the valve body 3. As the hand wheel 1 is rotated clockwise or anticlockwise, the sliding indicator 26 is moved against the window 29 of the hand wheel 1 since the axial movement of the sliding indicator 26 is driven by the indicator 27. Consequently, the colour indicated in the window 29 of the hand wheel 1 is changed in accordance with the direction of hand wheel rotation and the status of the shut off valve 2.

The sliding indicator 26 is able to indicate three states of the shut-off valve 2—opened, partially opened and closed. For indication of activation of the emergency stop mechanism, there are bars on the top of the hand wheel 1 which, when pushed, moves over the sliding indicator 26 in the window 29 of the hand wheel 1. These bars stay in the window 29 until emergency stop mechanism is reset.

The skilled person realises that a number of modifications of the embodiments described herein are possible without departing from the scope of the invention, which is defined in the appended claims.

For instance, the hand wheel 1 may be directly connected to the sliding spindle 9 and/or to the pin member 14.

The inner and the outer threading, respectively, may be a high-pitched threading.

The pin element connects the sliding spindle with the sealing element. However, it should be noted that in one preferred embodiment, there is no permanent connection between the sliding spindle and the pin element or between the pin element and the sealing element.

The invention claimed is:

1. A shut-off valve for controlling flow of a pressurised gas, comprising:
   a body defining a passage extending between a gas inlet channel and a gas outlet channel;
   a sealing element arranged to, in a first position, close the passage, and in a second position, open the passage to allow a pressurised gas to flow between the gas inlet channel and the gas outlet channel through the passage; and
   an emergency stop mechanism configured to immediately move the sealing element into the first position upon actuation, thereby closing the passage to prevent the pressurised gas from flowing between the gas inlet channel and the gas outlet channel wherein the emergency stop mechanism comprises:
   a sliding spindle connected to the sealing element;
   a biasing element for biasing the sealing element in a direction towards the sliding spindle;
   a rotation spindle in rotational engagement with the sliding spindle; and
   an engagement member configured to prevent axial movement of the sliding spindle in relation to the rotation spindle when the shut-off valve is in a normal state and to allow axial movement of the sliding spindle in relation to the rotation spindle when the shut-off valve is in an emergency state.

2. The shut-off valve according to claim 1, wherein:
   the sliding spindle comprises a through hole for holding the engagement member;
   the rotation spindle comprises a recess adapted for receiving a portion of the engagement member when the shut-off valve is in the normal state; and
   the shut-off valve further comprises a pin member movably arranged in the sliding spindle and comprising a recess adapted for receiving a portion of the engagement member when the shut-off valve is in the emergency state.

3. The shut-off valve according to claim 2, wherein when the sealing element moves to the second position, the pin member moves in an axial direction to align its recess with the through hole of the sliding spindle and the recess of the rotation spindle, so that the engagement member moves out of the recess of the rotation spindle and into the recess of the pin member, thereby activating the emergency state of the shut-off valve by allowing axial movement of the sliding spindle and movement of the sealing element into the first position.

4. The shut-off valve according to claim 2, further comprising:
   a hand wheel connected to the pin member and the sliding spindle.

5. The shut-off valve according to claim 1, further comprising:
   a pin element at least partly arranged in the passage that connects the sliding spindle with the sealing element, wherein the biasing element is arranged for biasing a first end of the sealing element such that a second end of the sealing element is in contact with the pin element.

6. The shut-off valve according to claim 5, wherein the pin element comprises:
   a guide for guiding the pressurised gas between the gas inlet channel and the gas outlet channel when the sealing element is in the second position, the guide extending in a longitudinal direction of the pin element and being arranged to allow the pressurised gas to leave the passage in a radial direction of the pin element.

7. The shut-off valve according to claim 6, wherein the guide comprises a longitudinally extending recess formed in an outer surface of the pin element, the outer surface extending between a first axial end and a second axial end of the pin element.

8. The shut-off valve according to claim 5, wherein the pin element comprises a restrictor at its axial end, which is in contact with the sealing element.

9. The shut-off valve according to claim 8, wherein the restrictor surrounds the pin element in a circumferential direction and is tapering in an axial direction from the axial end, which is in contact with the sealing element.

10. The shut-off valve according to claim 5, wherein:
    the body comprises an inner threading;

the rotation spindle is connected to the pin element via the sliding spindle and has an outer threading in engagement with the inner threading of the body;

rotation of the sliding spindle rotates the rotation spindle in a first direction to move the sealing element from the first position to the second position via the pin element; and rotation of the sliding spindle in a second direction allows the sealing element to move from the second position to the first position via the biasing element.

11. The shut-off valve according to claim 10, wherein the inner threading and the outer threading each include high-pitched threading.

12. The shut-off valve according to claim 1, further comprising:

a hand wheel connected to the sliding spindle.

13. The shut-off valve according to claim 1, further comprising:

a lower spindle housing the sealing element and in connection with the biasing element.

14. The shut-off valve according to claim 1, wherein the gas inlet channel and the passage are arranged essentially perpendicular to each other, the gas outlet channel and the passage are arranged essentially perpendicular to each other, and the gas inlet channel and the gas outlet channel are arranged in parallel with a distance between them, the distance being bridged by the passage.

15. The shut-off valve according to claim 1, further comprising:

a status indicator adapted to indicate a state of the shut-off valve.

16. A method for controlling flow of the pressurised gas with the shut-off valve according to claim 1, the method comprising:

moving the sealing element from the first position to the second position to allow the pressurised gas to flow between the gas inlet channel and the gas outlet channel through the passage; and moving the sealing element from the second position to the first position to prevent the pressurised gas from flowing between the gas inlet channel and the gas outlet channel through the passage.

17. A method for activating the emergency stop mechanism of the shut-off valve according to claim 1, the method comprising:

activating the emergency stop mechanism to cause the sealing element to immediately move into the first position, thereby closing the passage to prevent the pressurised gas from flowing between the gas inlet channel and the gas outlet channel.

* * * * *